United States Patent [19]

Thorn

[11] Patent Number: 5,142,996
[45] Date of Patent: Sep. 1, 1992

[54] TABLE ASSEMBLY

[75] Inventor: William M. Thorn, Killen, Ala.

[73] Assignee: Hunt Holdings, Inc., Wilmington, Del.

[21] Appl. No.: 673,329

[22] Filed: Mar. 22, 1991

[51] Int. Cl.⁵ .............................................. A47B 3/06
[52] U.S. Cl. .................................... 108/153; 403/260
[58] Field of Search ............... 108/153, 154, 160, 161; 403/258, 260; 248/188

[56] References Cited

U.S. PATENT DOCUMENTS

| | | | |
|---|---|---|---|
| 2,592,839 | 4/1952 | Wessig | 108/153 X |
| 4,080,081 | 3/1978 | Wah et al. | 403/260 X |
| 4,270,872 | 6/1981 | Kiyosawa | 403/260 X |
| 4,280,269 | 7/1981 | Marini | 403/260 X |

FOREIGN PATENT DOCUMENTS

| | | | |
|---|---|---|---|
| 3305182 | 8/1984 | Fed. Rep. of Germany | 108/153 |
| 2382215 | 9/1978 | France | 108/154 |

*Primary Examiner*—Jose V. Chen
*Attorney, Agent, or Firm*—Synnestvedt & Lechner

[57] ABSTRACT

A system for the firm, long-lived suppot of a table top on a pair of floor-mounting pedestals comprises a pair of parallel metal rails fastened to the underside of the table, on opposite sides on the center-line of the table top; a pair of pedestals are fastened to each of the two adjacent ends of the rails by bolts which pass through the pedestals and into internally-threaded inserts welded to vertical channel members, which channel members are in turn welded to the ends of the rails. In each such mounting assembly, the channel member has a rectangular horizontal cross-section, and extends beneath the level of the adjacent rail; one of the inserts in each mounting assembly is positioned below the level of the bottom of the associated rail. The inserts are positioned inside the channel member, with their open ends facing corresponding holes in the opposed wall of the channel member, through which holes and the mounting bolts extend into the inserts.

3 Claims, 2 Drawing Sheets

TABLE ASSEMBLY

FIELD OF THE INVENTION

This invention relates to table assemblies and particularly to apparatus for mounting a table top upon its support means.

BACKGROUND OF THE INVENTION

A typical table assembly comprises a top and two or more table support means, for example four legs or two pedestals, for supporting a table top. The support means are typically fastened to the ends of rails secured to the underside of the table top.

In a conventional arrangement of this type, a pair of wooden rails extend parallel to each other along the bottom surface of the table top and are secured thereto by appropriate screws or brackets, for example. The table support means may then be secured to the ends of the rails by appropriate screws which extend through the support means and into the wood at the ends of the rails. While adequate for many purposes, such constructions provide a support for the table top which is less secure than desirable, particularly over a long period of time, partly because the screws can loosen in the wood upon repeated removal and insertion in disassembling and reassembling the table, and partly because substantial leverage is exerted on the screws, tending to pull them or loosen them, when the table support means are subjected to torquing or pivoting forces about an axis normal to the length of the rails. Such forces exist, for example, when one moves a table about by seizing the top and dragging the table along rough and resistant surfaces.

Accordingly, it is an object of the present invention to provide a new and useful table assembly, and particularly a fastening arrangement for fastening the table support means to the table top.

Another object is to provide such a table system and fastening arrangement which is inexpensive, easy to assemble, and provides a firm, long-lasting and tight connection of the table support means to the rails.

BRIEF SUMMARY OF THE INVENTION

These and other objects of the invention are attained by the provision of a table system in which a vertical channel member is secured to each end of each rail member. The rail members are preferably of metal, as are the channel members which are bonded to the ends of the rails, as by welding. To each channel member at least two threaded insert members are affixed, as by welding. The threaded portions of the inserts preferably extend horizontally within the channel members and are aligned with holes provided in the outer, opposed wall of the channel member, through which holes appropriate bolts or other fastening means can be inserted to threadingly engage the insert members.

The support means, such as pedestals or legs, are secured to the rails by passing bolts or the like through the support members and through the holes in the channel members into the threaded inserts, and then tightening the bolts to hold the support means tightly against the outer flat surfaces of the channel members.

Preferably, at least one of the insert members is secured to its associated channel member at a position lower than the lower side of the associated rail member, so as to provide an increased distance between the two insert members, thereby to provide greater resistance against loosening forces due to any torque exerted on the support means about an axis normal to the rails.

In this way there is provided a table assembly in which the support means are firmly and rigidly secured to the rails so as to maintain a tight, secure connection over long periods of time. The components are easy and inexpensive to fabricate and to disassemble and reassemble.

BRIEF DESCRIPTION OF THE DRAWINGS

These and other objects and features of the invention will be more readily understood from a consideration of the following detailed description, taken in connection with the accompanying drawings, in which.

DETAILED DESCRIPTION OF SPECIFIC EMBODIMENTS

Figure 1:
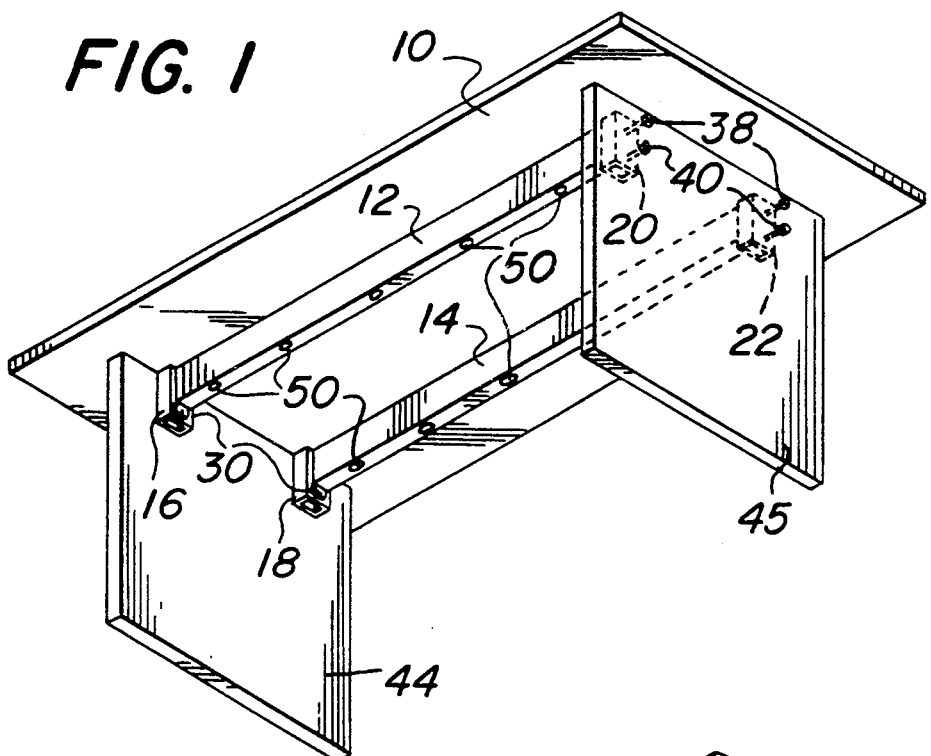
FIG. 1 is a perspective view looking upward from beneath a table assembly embodying the invention.
Figure 2:
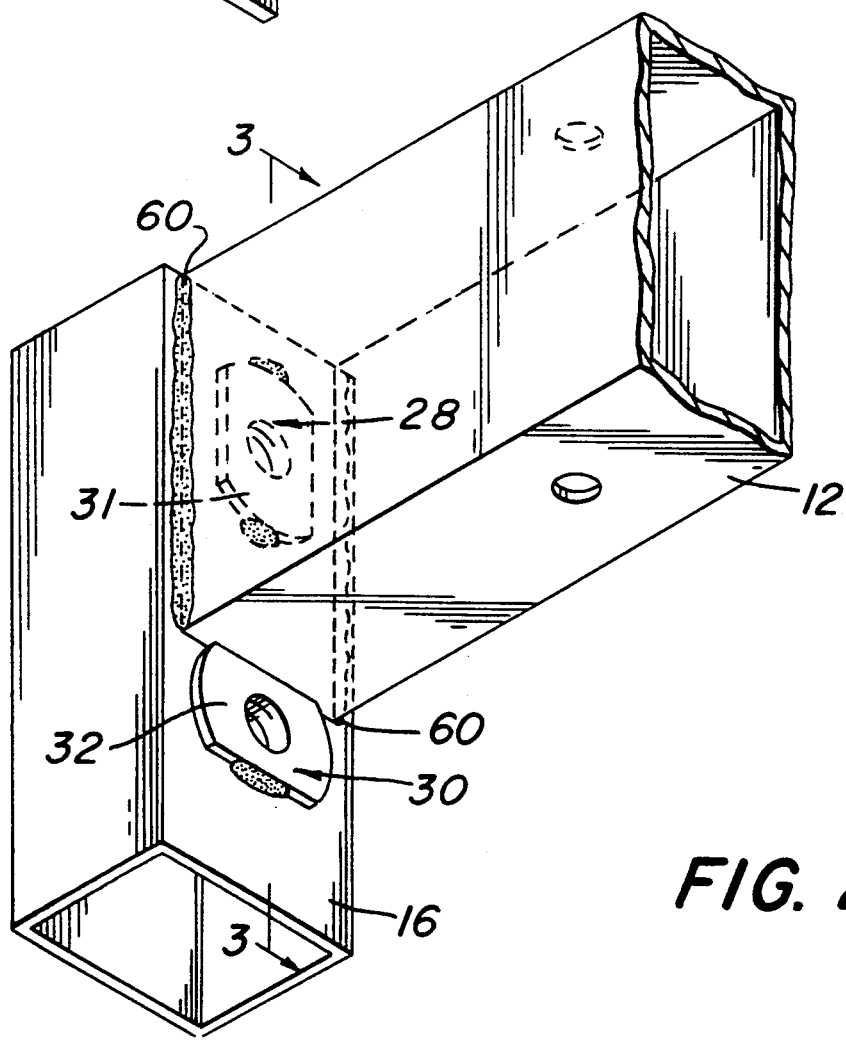
FIG. 2 enlarged fragmentary perspective view, looking upward from beneath, of a portion of the assembly shown in FIG. 1.
Figure 3:
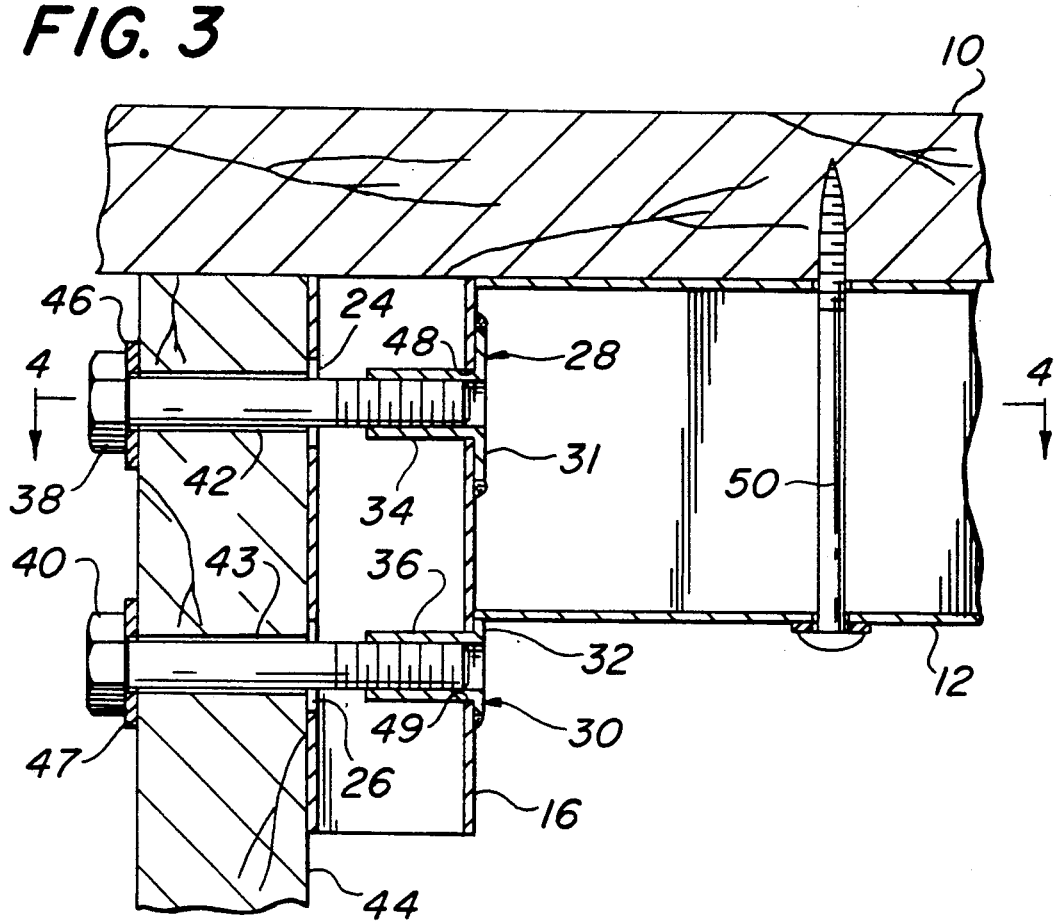
FIG. 3 is a side elevational sectional view taken along lines 3—3 of FIG. 2.
Figure 4:
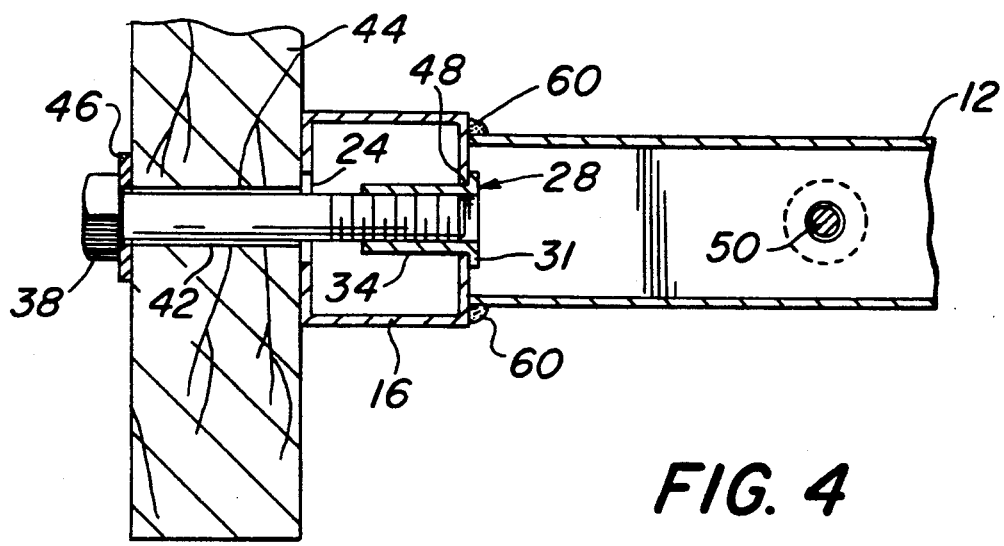
FIG 4 is a horizontal sectional view of the supporting structure of FIG. 3, taken along lines 4—4 of FIG. 3.

Turning now to the preferred embodiment of the invention shown by way of example only in the drawings, and without thereby in any way limiting the scope of the invention, FIG. 1 shows a table assembly comprising a table top 10, such as for a conference table, to the underside of which top are secured a pair of longitudinally extending metal rails 12 and 14. The rails are open at their ends, and channel members 16, 18, 20 and 22 are welded to the ends of the rails, one to each rail end. Each such channel member extends downwardly below the lower end of its associated rail end, as shown, and is provided with a pair of holes such as 24 and 26 (see FIG. 3), one directly above the other, in the side face thereof more remote from the associated rail end. Within each channel member, and aligned with these holes, are a pair of internally threaded insert members, such as 28 and 30, having integral ears such as 31, 32 which are welded to the outside of that wall of the channel member which is adjacent to the associated rail end. The threaded insert members comprise cylindrical portions such as 34, 36 which are open at the ends thereof opposite from the ends which are welded to the channels, and which contain the internal threads, so as to receive respective bolts such as 38 and 40. These bolts extend through bores such as 42, 43 in the pedestals 44, 45 which serve as support means for the table top. Appropriate washers such as 46, 47 are provided beneath the heads of the bolts. The cylindrical portions such as 34, 36 of the inserts extend inwardly of the channels through holes such as 48, 49.

By tightening the bolts such as 38, 40, the pedestals are drawn against the flat vertical outer surfaces of the channel members; the fact that one of the inserts in each vertical channel member is located below the bottom of its associated rail provides an increased vertical spacing between the adjacent insert members, providing greater resistance against torques tending to rotate the pedestal with respect to an axis perpendicular to the rail members, and thus enhancing the continued tightness and longevity of the joint.

The complete understructure under the table top is preferably assembled before it is secured to the table top. In the preferred order of assembly, the insert members are placed in position and welded in place in the channel members; the channel members are then welded to the ends of the rails, and the complete assembly then secured to the underside of the table top 10 by screws such as 50 extending through appropriate holes in the rails into the underside of the table top.

In order to provide a smooth welded region not likely to snag the clothing of persons using the table, the channel members 16, 18, 20 and 22 are preferably somewhat wider than the rail members 12, 14, e.g. by about ¼", to leave a ⅛" recess between the side surfaces of the rails and the adjacent channel members, in which a fillet weld such as 60 is formed.

There is thereby provided a new and useful table assembly which is inexpensive and easy to fabricate and assemble, yet provides reliable, long-lasting, secure and tight mounting of the table top to the support means.

While the invention has been shown and described with particular reference to specific embodiments in the interest of complete definiteness, it will be understood that it may be embodied in a variety of forms differing substantially from those shown and described, without departing from the spirit and scope of the invention as defined by the appended claims.

I claim:

1. A table support assembly, comprising:
    at least one hollow metal rail securable to a table top;
    channel members of rectangular cross-section, one bonded to each end of said at least one rail, each said channel member having a first face which covers and extends below an open end of said rail member;
    at least two internally-threaded insert members bonded to and extending within each of said channel members, each of said insert members having its threaded portion extending horizontally and parallel to said rail, said channel members each having holes in the wall thereof opposite from said face, which holes are aligned with said threaded portions, at least one of said insert members on each of said channel members being at a position which is lower than said rail;
    table support means for supporting said table on a floor; and
    threaded fasteners extending through said table support means and said holes into said threaded portions of said insert members, to hold said table support means against said channel member.

2. The system of claim 1, wherein each of said rails is open at both ends; each of said channel members is welded to one of said rails; each of said insert members comprises an internally-threaded cylinder and a pair of integral ears extending radially therefrom and welded to the outside of said first face of said channel member adjacent to its associated rail end; each said cylinder is open at the end thereof more remote from the rail end to which it is welded, to receive a corresponding one of said fasteners; and said fasteners each comprise a bolt threaded to engage the internal threads of its corresponding insert member.

3. The system of claim 1, wherein said face of each of said channel members is wider than the rail end which it covers, to form an open corner between channel member and rail wherein a fillet weld is provided.

* * * * *